Jan. 1, 1952

C. W. BREWER 2,580,726

BUN FORMING MACHINE

Filed April 11, 1949

CARLOS W. BREWER
Inventor

By Herbert J. Brown

Attorney

Jan. 1, 1952     C. W. BREWER     2,580,726
BUN FORMING MACHINE
Filed April 11, 1949     3 Sheets-Sheet 2
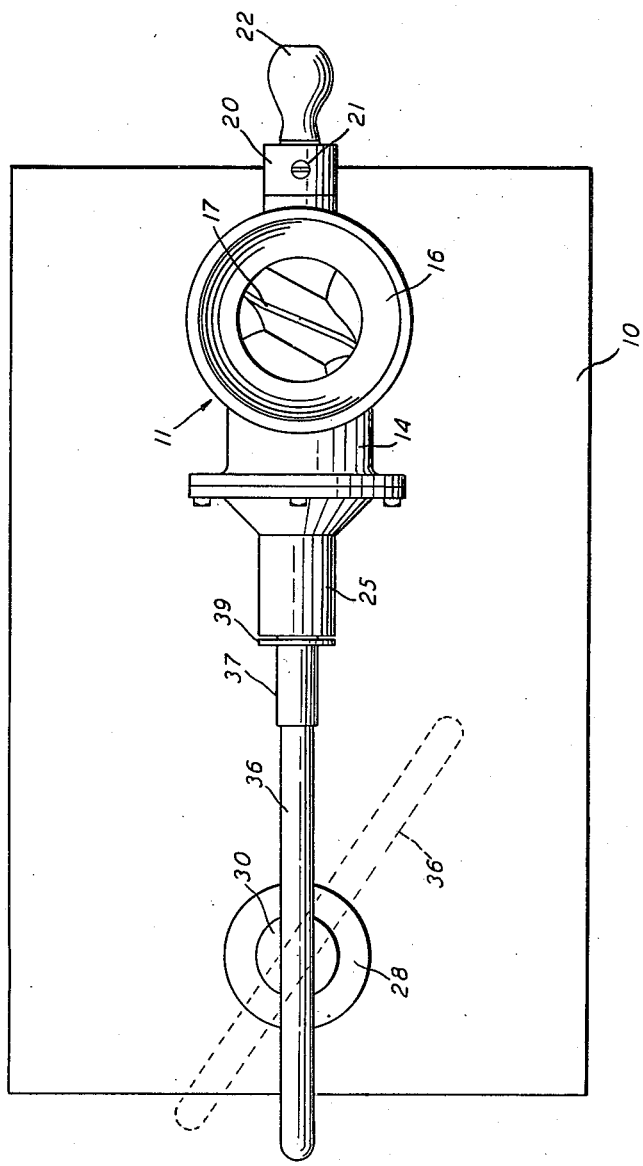
Fig. 2
CARLOS W. BREWER
Inventor
Attorney Jan. 1, 1952
C. W. BREWER
2,580,726
BUN FORMING MACHINE
Filed April 11, 1949
3 Sheets-Sheet 3
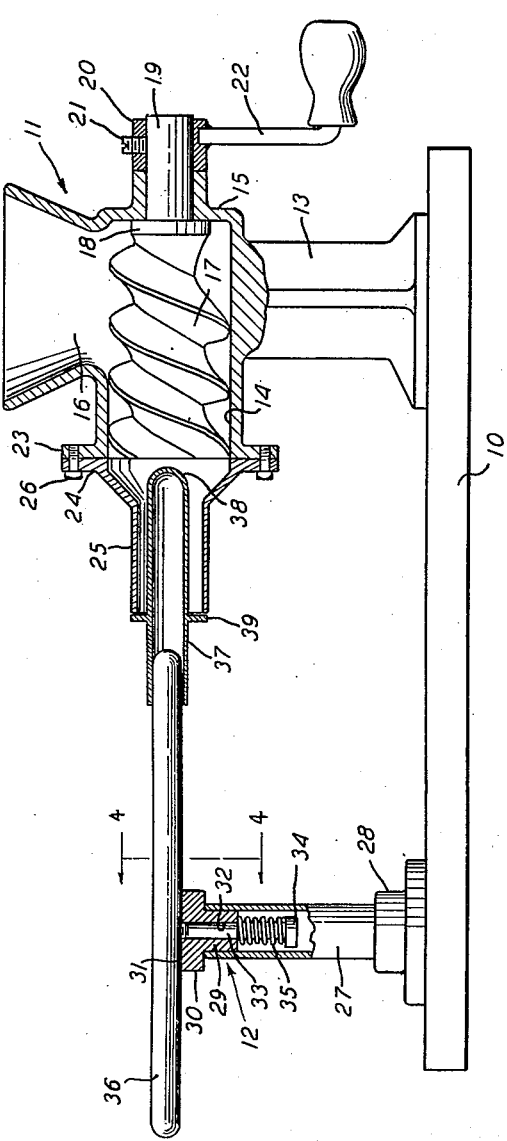
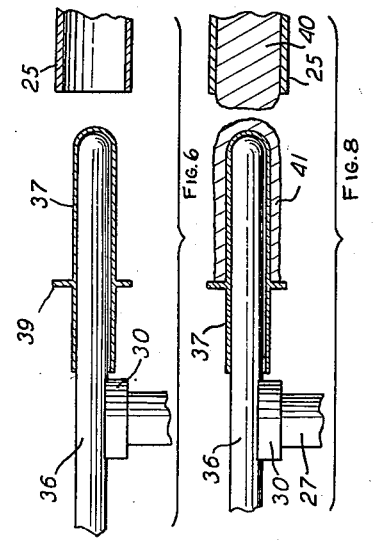
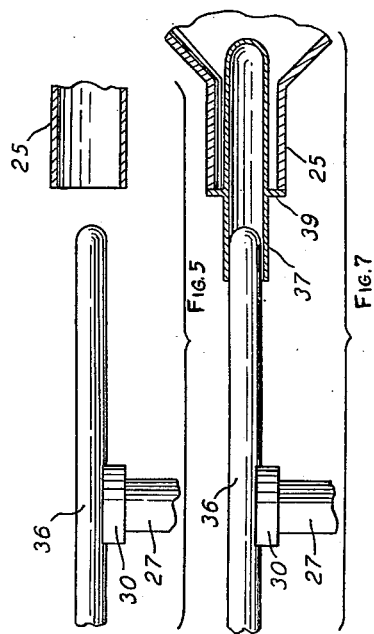
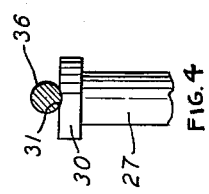
Carlos W. Brewer
Inventor
By Herbert J. Brown
Attorney Patented Jan. 1, 1952

2,580,726

UNITED STATES PATENT OFFICE 2,580,726

BUN FORMING MACHINE

Carlos W. Brewer, Fort Worth, Tex.

Application April 11, 1949, Serial No. 86,747

2 Claims. (Cl. 107—1)

This invention relates to baking equipment, and has reference to a machine for making buns, doughnuts, and the like having recesses therein for receiving food. The invention is particularly adaptable to the forming of elongated buns and the like having deep recesses and closed ends for receiving frankfurters, relish, and other food, and which buns, etc., will not drip juices or relishes when held in an upright position.

An object of the present invention is to provide a machine for quickly and easily forming the dough prior to cooking the same.

Another object of the invention is to provide, in a machine for forming recesses in buns or the like, a construction and arrangement whereby the products so formed are all substantially uniform, and wherein each cooked unit contains approximately the same amount of dough.

Another object of the invention is to provide, in a machine of the referred to class, a centering mechanism whereby the recesses formed in the individual products are well centered.

These and other objects of the invention will become apparent from the following description and the accompanying drawings, wherein:

Figure 2 is a plan view of Figure 1.

Figure 3 is an elevation and broken sectional view similar to Figure 1, and showing the relative positions of the operating parts.

Figure 4 is a transverse view taken on line 4—4 of Figure 3.

Figure 5 is a sectional view and broken elevation of the dough spout and mandrel guide prior to placing the mandrel on the latter.

Figure 6 is a view similar to Figure 5, but showing the sliding mandrel in the guide.

Figure 7 is a view similar to Figure 6, but showing the mandrel received within the dough spout, and Figure 8 is a view similar to Figure 7, but showing the dough formed on the sliding mandrel.

Figure 1:
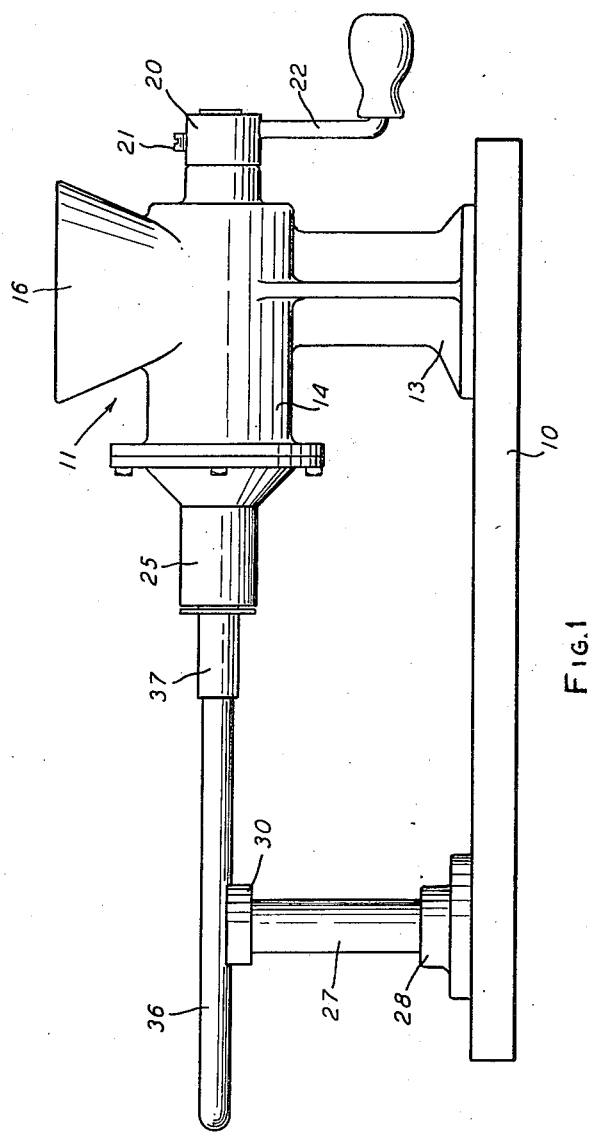
Figure 1 is a side elevation of a bun or doughnut forming machine embodying the features of the present invention.

The exemplary form of the invention shown includes a base 10, a dough dispenser 11, and a mandrel support assembly 12. The dispenser 11 is comprised of a vertical support 13 secured to one end of the base 10, a horizontal cylinder 14 which is closed, as at 15, at its outer end, and a hopper 16 above and opening into said cylinder. Within the cylinder 14 there is a conveyor screw 17 having a shoulder 18 disposed for rotatably bearing against the closed cylinder end 15. A shaft 19, integral with the screw 17, extends outwardly of the dispenser 11 through the closed end 15 of the cylinder 14. A collar 20 is detachably secured on the outer end of the shaft 19 by means of a set screw 21, and a crank 22 is welded or otherwise secured to said collar for turning the conveyor screw 17.

The end of the cylinder 14, opposite its closed end 15, is outwardly flanged, as at 23, to receive and support the flanged end 24 of a cylindrical dough spout 25. The respective flanges 23 and 24 are detachably secured to each other by screws 26.

The mandrel assembly 12 includes a vertical tubular standard or post 27 supported on the base 10 opposite the dispenser 11 and is spaced from the dough spout 25. A suitable flanged collar 28 secures the post 27 to the base 10. A bearing 29 is pressed or otherwise secured in the upper end of the tubular post 27, and which bearing is provided with an enlarged upper end 30 having a transverse notch 31 across its upper surface, as shown in Figures 3 and 4. There is a vertical opening 32 through the center of the bearing 29 for rotatably receiving a shaft 33 in the form of a headed screw. As shown in Figure 3, the head 34 of the shaft 33 is below the lower end of the bearing 29, and a compression spring 35 is positioned around said shaft and between said head and said bearing. The upper end of the shaft 33 is threaded into a transverse mandrel guide 36 which is in axial alignment with the center of the dough spout 25 during the dough forming operation.

One of the projecting ends of the guide 36 slidably receives a tubular mandrel 37 having a round closed outer end 38, and a locating flange 39 around its outer surface and spaced from said round end.

The operation of the device is progressively illustrated in Figures 5 through 8. The guide 36 is partially rotated by hand on the shaft 33 to assume the position shown by dotted lines in Figure 2 and the mandrel 37, having grease over its surface, is positioned thereon. The guide 36 and mandrel 37 are then aligned with the center of the spout 25, and by reason of the described notch 31 and action of the spring 35, the mandrel is maintained in such position. The mandrel 37 is then moved into the spout 25, as shown in Figure 7. By turning the crank 22, dough 40 within the hopper 16 is moved into the cylinder 14, outwardly into the spout 25 and around the mandrel 37. The operator's hand is then removed from the mandrel 37, but the operation of the crank 22 is continued until the mandrel has moved completely out of the spout 25, as shown in Figure 8. The dough 40 is then severed between the spout 25 and the mandrel 37, leaving an uncooked bun or doughnut 41 on the latter. The mandrel with the bun, etc., formed thereon, is then cooked. After cooking, the product is easily removed from the mandrel. It is to be understood that a multiple of the described mandrels 37 are to be employed for cooking in quantities, and that mandrels used subsequent to the first one are formed into the dough 40 remaining in the spout 25.

The described form of the invention may be made in many ways within the scope of the appended claims.

What is claimed is:

1. In a machine for forming recesses in dough products, a dough spout including a discharge end, a guide positioned outwardly of and spaced from the center of said discharge end of said spout, a tubular mandrel having a closed end slidably mounted on said guide, said closed end being directed toward said discharge end of said spout and adapted to be slidably received in the latter together with a portion of said mandrel, the outer diameter of said mandrel being smaller than the inner diameter of said spout discharge end by an amount equal to the wall thickness of the dough product formed therebetween.

2. In a machine for forming recesses in dough products, a cylindrical dough spout including an annular discharge end, a guide positioned outwardly of and in alignment with the center of said discharge end of said spout, a tubular mandrel having a closed end slidably mounted on said guide, said closed end being directed toward said discharge end of said spout and adapted to be slidably received in the latter together with a portion of said mandrel, a flange projecting from said mandrel and adapted to engage said discharge end when said mandrel is received within said spout, the outer diameter of said mandrel being smaller than the inner diameter of said spout discharge end by an amount equal to the wall thickness of the dough product formed therebetween.

CARLOS W. BREWER.

REFERENCES CITED

The following references are of record in the file of this patent:

UNITED STATES PATENTS

| Number | Name | Date |
|---|---|---|
| 754,549 | Dietz | Mar. 15, 1904 |
| 978,224 | Schrader et al. | Dec. 13, 1910 |
| 1,984,027 | Lyons | Dec. 11, 1934 |
| 2,189,217 | McDonald | Feb. 6, 1940 |
| 2,447,182 | Hutchinson | Aug. 17, 1948 |